(No Model.) 2 Sheets—Sheet 1.
A. OLMESDAHL.
MACHINE FOR CUTTING MATERIAL INTO CURVED FORMS.
No. 511,453. Patented Dec. 26, 1893.
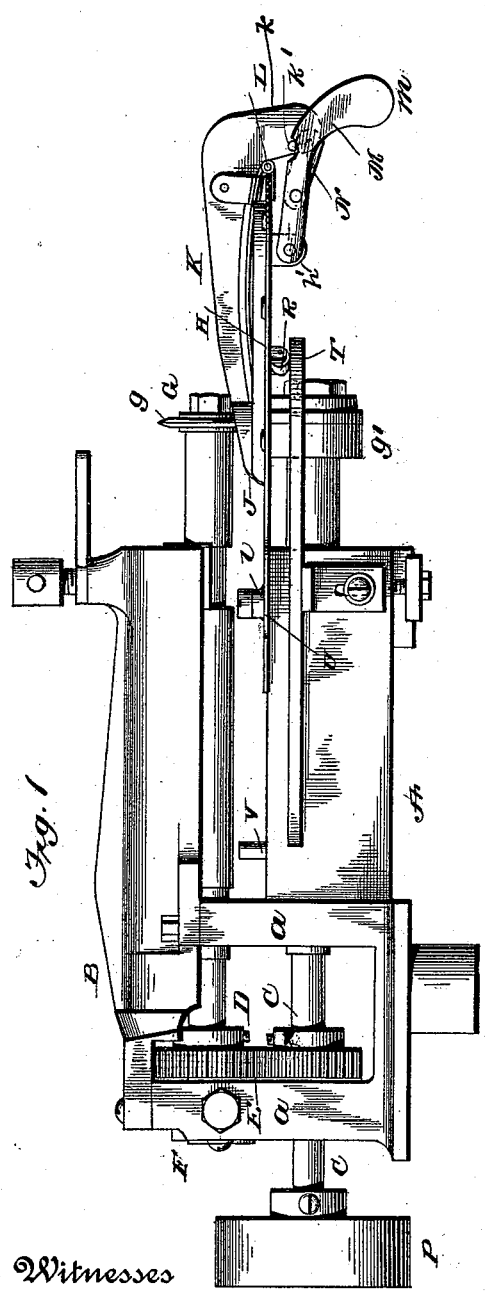
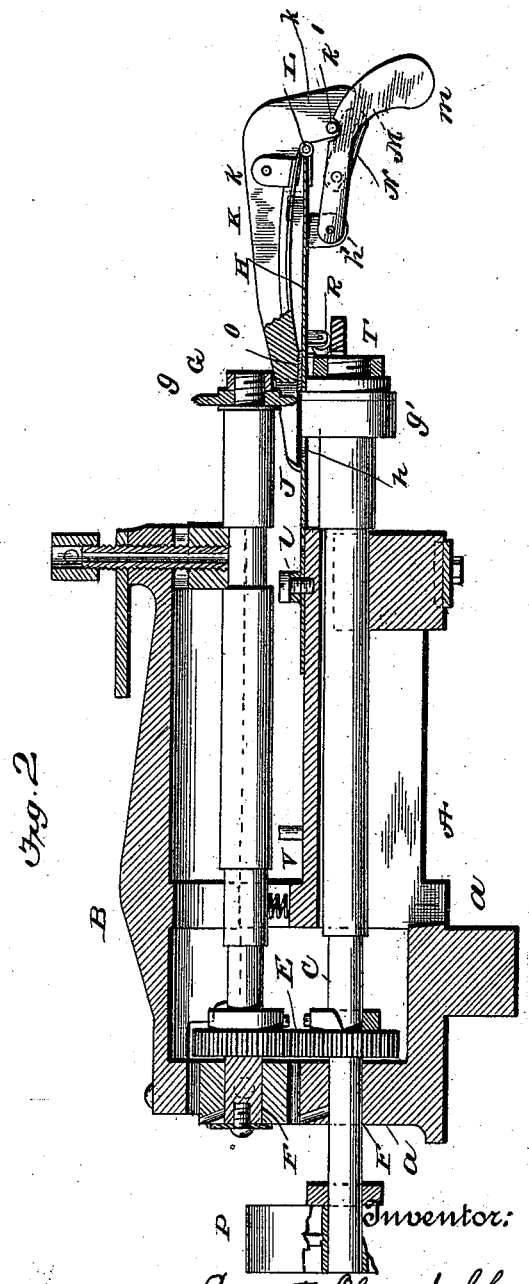
Witnesses
Inventor:
August Olmesdahl
By T. J. W. Robertson, Attorney

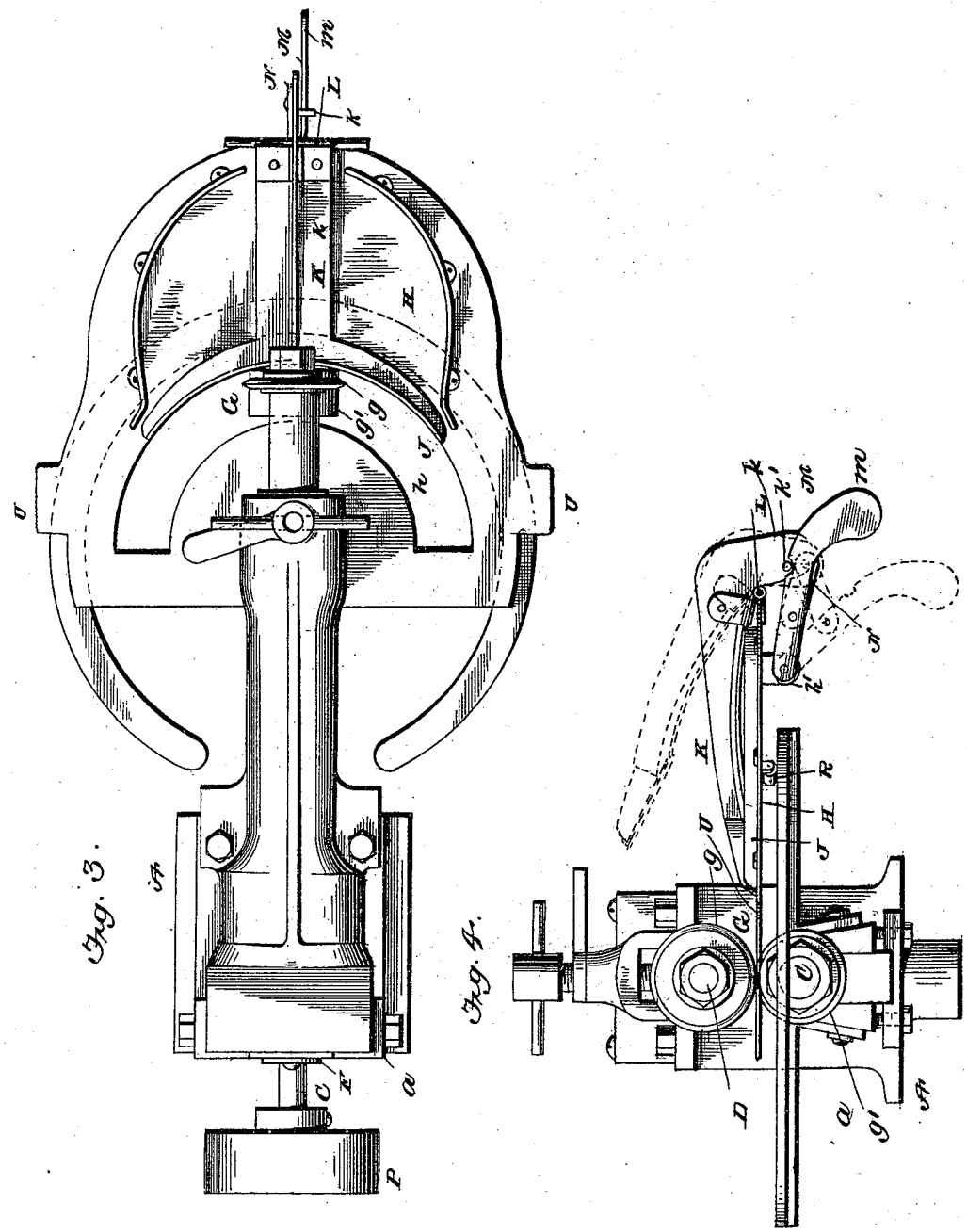

UNITED STATES PATENT OFFICE.

AUGUST OLMESDAHL, OF NEW YORK, N. Y., ASSIGNOR TO ANTHONY EISLER, OF SAME PLACE.

MACHINE FOR CUTTING MATERIAL INTO CURVED FORMS.

SPECIFICATION forming part of Letters Patent No. 511,453, dated December 26, 1893.

Application filed March 6, 1893. Serial No. 464,751. (No model.)

*To all whom it may concern:*

Be it known that I, AUGUST OLMESDAHL, a citizen of the United States of America, residing at New York city, in the county and State of New York, have invented certain new and useful Improvements in Apparatus for Cutting Material into Curved Forms, of which the following is a specification, reference being had therein to the accompanying drawings.

This improvement is designed principally to cut curved edges on small sheets of plastic material, but may also be used for cutting other material, such as woven or other textile fabrics, paper, &c., and the invention consists in the peculiar construction, arrangement and combinations of parts hereinafter more particularly described and then definitely claimed.

In the accompanying drawings—Figure 1 is a side view of a machine constructed according to my improvement. Fig. 2 is a central vertical longitudinal section of the same. Fig. 3 is a plan of the same, and Fig. 4 is a front view showing some of the parts in different positions.

Referring now to the details of the drawings by letter—A is the base of the machine from which rise standards a a, to the top of which is secured by bolts and screws the arm B.

Mounted in the base is the lower or driving shaft C, which is connected to the upper shaft D by the cog-wheels E. The shafts C and D are both journaled in suitable bearings F, but as there is nothing new in these parts it is unnecessary to describe them further. At the outer extremity of the shafts is a rotary cutting apparatus G, consisting of the rotary cutter g and the roller g', the latter forming a support for the material while it is being cut. The shaft C preferably carries a belt pulley P.

A plate or carrier H is pivoted to the base A by a screw l, and attached to this carrier in any convenient manner are guides J, which may or may not be of the shape of the outer curve of the article whose inner curve is to be cut by the machine. At h is shown an opening through which the cutters work.

Above the plate H is a clamp K hinged at L to the carrier and provided with a downwardly extending arm k to which are connected the toggle levers M N, the latter being pivoted to an arm h' projecting from the under side of the carrier and the former (M) pivoted to said arm k and having an extension m which serves as a lever to raise or fasten the clamp. The front of the clamp is curved as shown in Fig. 3 or made of a shape to substantially correspond with the curve of the edge the apparatus is designed to cut, and is provided with a pad O of cloth, felt, or some soft substance, to securely hold the blank without squeezing it so hard as to deface it, which might be the case when plastic material is employed. Underneath the plate H are two friction-rollers R which travel over a semi-circular track T attached to the base A.

The operation is as follows: The clamp is raised as shown in dotted lines in Fig. 4, and the blank is set on the carrier inside the guides J, and the clamp set down upon the blank by moving the handle m of the lever M in the position shown in full lines in which position it is locked by the toggle passing slightly over the center until the lever M comes in contact with a pin k' on the arm k which thus holds the clamp down. Motion is now given to the carrier H by hand and as the blank passes under the revolving cutter g, the inner or concave curve is cut on the blank with great accuracy and neatness. The clamp is then raised, the cut blank removed and another blank inserted and the operation repeated. If the cutters are run by a belt on the pulley P so as to always run in the same direction, the plate and clamp should be drawn back to their original positions before the second cut is made, but if the cutting device is operated by hand so that it can be turned in either direction, then the cutting operation may be performed on both the forward and backward motion of the plate and clamp. To prevent the carrier being moved too far around, it is provided with ears U which come in contact with a pin V on the base of the machine, but these ears are not absolutely necessary.

I do not limit myself to the exact construction shown, as other forms of cutting devices may be readily adapted for use instead of the rotary cutters shown, such for instance as a reciprocating or vibrating blade or shears, and for some articles a reciprocating or rotary saw may be used.

What I claim as new is—

1. In a cutting machine, and in combination with a cutting device, a carrier moving on a fixed pivot, a clamping device attached to the carrier, said carrier and clamp each being provided with a curved edge substantially corresponding to a circle of which the pivot is the center, substantially as described.

2. The combination in a cutting machine, of a cutter, a support for the material to be cut, a carrier pivoted to the frame of the apparatus beneath the shaft of the cutter, and a clamp for holding the blank to the carrier, substantially as described.

3. The combination in a cutting apparatus, of a rotary cutter, a rotary device supporting the material being cut against the pressure of the cutter, a frame carrying the shafts of the cutter and supporting device, a carrier pivoted to the frame between the shafts of the cutter and the supporting device, a clamp pivoted to the carrier near the outer edge thereof, and means for locking the clamp in a closed position, substantially as described.

4. The combination in a cutting machine, of a rotary cutter, a revolving support for the material to be cut, a carrier pivoted to the frame of the machine, and a clamp pivoted near the outer edge of the carrier and means for locking the clamp in a closed position, substantially as described.

5. The combination in a cutting apparatus, of the rotary cutter $g$ and roller $g'$, with the pivoted carrier H, the clamp K having arm $k$, the toggle levers M N, the track T and the rollers R, all substantially as shown and described.

In testimony whereof I affix my signature, in presence of two witnesses, this 25th day of February, 1893.

AUGUST OLMESDAHL.

Witnesses:
TERRY SMITH,
G. F. PIERCE.